(12) United States Patent
Ahn et al.

(10) Patent No.: US 11,703,684 B2
(45) Date of Patent: Jul. 18, 2023

(54) APPARATUS AND METHOD FOR PROVIDING CLUSTER INFORMATION USING 3D IMAGE

(71) Applicant: HYUNDAI MOBIS Co., Ltd., Seoul (KR)

(72) Inventors: Sung Joon Ahn, Seoul (KR); Myung Bin Choi, Seoul (KR); Seung Hwan Lee, Yongin-si (KR); Tae Hun Kim, Yongin-si (KR); Kyung Hoon Kim, Yongin-si (KR)

(73) Assignee: HYUNDAI MOBIS Co., Ltd., Seoul (KR)

( * ) Notice: Subject to any disclaimer, the term of this patent is extended or adjusted under 35 U.S.C. 154(b) by 188 days.

(21) Appl. No.: 17/368,974

(22) Filed: Jul. 7, 2021

(65) Prior Publication Data

US 2022/0011573 A1 Jan. 13, 2022

(30) Foreign Application Priority Data

Jul. 8, 2020 (KR) .................. 10-2020-0084317

(51) Int. Cl.
*G02B 27/01* (2006.01)
*G09G 3/00* (2006.01)
*B60K 35/00* (2006.01)

(52) U.S. Cl.
CPC .......... *G02B 27/0101* (2013.01); *B60K 35/00* (2013.01); *G09G 3/003* (2013.01); *B60K 2370/1531* (2019.05); *B60K 2370/332* (2019.05); *B60K 2370/347* (2019.05); *G02B 2027/0141* (2013.01); *G09G 2300/02* (2013.01); *G09G 2320/08* (2013.01); *G09G 2380/10* (2013.01)

(58) Field of Classification Search
CPC ............ B60K 35/00; B60K 2370/1531; G09G 3/003; G09G 2320/08; G09G 2380/10; G02B 2027/0141
See application file for complete search history.

(56) References Cited

U.S. PATENT DOCUMENTS

| 10,314,222 | B2* | 6/2019 | Demiter | ................. A01B 69/00 |
| 2021/0031631 | A1* | 2/2021 | Nakamura | ................. B60J 5/04 |
| 2022/0169298 | A1* | 6/2022 | Aoki | ................... B60R 11/0229 |

FOREIGN PATENT DOCUMENTS

CN 208935854 U * 6/2019

OTHER PUBLICATIONS

English translation of CN-208935854-U (Year: 2019).*

* cited by examiner

*Primary Examiner* — Grace Q Li
(74) *Attorney, Agent, or Firm* — NSIP Law

(57) ABSTRACT

The present invention relates to an apparatus and method for providing cluster information using a three-dimensional (3D) image. The apparatus for providing the cluster information using the 3D image according to the present invention includes an input unit configured to receive display mode setting information and driving information, a memory configured to store a cluster information providing program that uses a 3D image, and a processor configured to execute the cluster information providing program, wherein the processor controls a light source disposed in a cluster according to the display mode setting information to display the driving information.

12 Claims, 16 Drawing Sheets

220c

RV

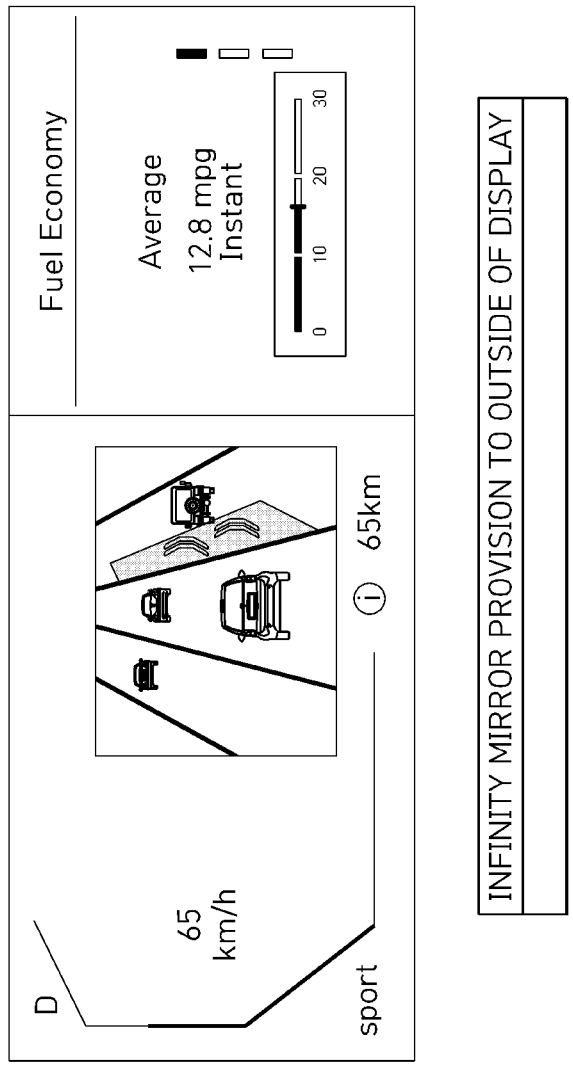

APPARATUS AND METHOD FOR PROVIDING CLUSTER INFORMATION USING 3D IMAGE

CROSS-REFERENCE TO RELATED APPLICATION

This application claims priority to and the benefit of Korean Patent Application No. 10-2020-0084317, filed on Jul. 8, 2020, the disclosure of which is incorporated herein by reference in its entirety.

BACKGROUND

1. Field of the Invention

The present invention relates to an apparatus and method for providing cluster information using a three-dimensional (3D) image.

2. Discussion of Related Art

According to the related art, three-dimensional (3D) stereoscopic display technology using light-emitting diodes (LEDs) as light sources has been proposed, and a stereoscopic effect is realized through the technology, and thus visibility and interest are induced.

However, according to the related art, although the stereoscopic effect is realized using half mirrors and LEDs, there is a limitation in that user interfaces (UIs) for various scenarios are not provided in environments (e.g., vehicle driving environments) that change in real time.

SUMMARY OF THE INVENTION

The present invention is directed to providing an apparatus for providing cluster information in which a cluster that is divided into a display area and a display and infinite reflection area to provide information using a three-dimensional (3D) image is provided and through which information about a changing driving environment is realized and displayed with a stereoscopic sense, thereby supporting a user to more intuitively recognize driving-related information, and a method of providing cluster information.

According to an aspect of the present invention, there is provided an apparatus for providing cluster information using a 3D image, which includes an input unit configured to receive display mode setting information and driving information, a memory configured to store a cluster information providing program that uses a 3D image, and a processor configured to execute the cluster information providing program. The processor controls a light source disposed in a cluster according to the display mode setting information to display the driving information including an infinite reflection image.

The cluster may include a display, a translucent mirror film stacked on the display, a light-emitting diode (LED) light source disposed on the translucent mirror film, and a translucent mirror stacked on the LED light source.

The translucent mirror film may have a preset area which is open.

The cluster may be divided into a display-only area and a display and LED stereoscopic pattern simultaneous use area.

The processor may transmit a command signal for providing information displayed in the simultaneous use area according to the display mode setting information.

When a display extension mode is set as a display mode, the processor may control the LED light source for the simultaneous use area to be turned off.

When a driving mode is set as a display mode, the processor may control the LED light source for the simultaneous use area to be turned on and control display information and the infinite reflection image with the LED light source to be displayed.

In the driving mode, the processor may control power state information to be displayed by turning the LED light source on and control regenerative braking state information to be displayed using the display information.

In the driving mode, the processor may control blinking of the LED light source using traveling behavior information of a nearby vehicle and control approach information of the nearby vehicle to be displayed.

The processor may control the approach information of the nearby vehicle to be displayed by differently controlling at least one of a blinking time interval and a blinking color of the LED light source.

According to another aspect of the present invention, there is provided a method of providing cluster information using a 3D image, which includes an operation (a) of checking setting information and external reception information and an operation (b) of providing cluster information including an infinite reflection image according to the setting information and the external reception information.

The operation (b) may include, when it is confirmed that the setting information is a default mode for a simultaneous use area, determining an LED light source for the simultaneous use area to be turned off.

The operation (b) may include, when it is confirmed that the setting information is a driving mode for the simultaneous use area, controlling display information and infinite reflection that uses the LED light source to be simultaneously displayed in the simultaneous use area.

The operation (b) may include, when traveling behavior information of a nearby vehicle is obtained as the external reception information in the operation (a), controlling the LED light source for the simultaneous use area to be turned on or off and controlling the traveling behavior information to be displayed.

The operation (b) may include determining a degree of collision risk according to the traveling behavior information and controlling at least one of a lighting timing and a color of the LED light source to be changed and displayed.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 7A through FIG. 7C illustrate exemplary diagrams of a gauge display of the information providing cluster using the 3D image according to the embodiment of the present invention.

DETAILED DESCRIPTION OF EXEMPLARY EMBODIMENTS

The above-described objects, other objects, advantages, and features of the present invention and methods of achieving the same will be clearly understood with reference to the accompanying drawings and the following detailed embodiments.

However, the present invention is not limited to the embodiments to be disclosed below but may be implemented in various different forms. The following embodiments are merely provided to easily inform those skilled in the art of the objects, configuration, and effects of the present invention. The scope of the present invention is defined by the appended claims.

Meanwhile, terms used herein are provided only to describe the embodiments of the present invention and not for purposes of limitation. In this specification, the singular forms include the plural forms unless the context clearly indicates otherwise. It will be understood that the terms "comprise" and/or "comprising," when used herein, specify some stated components, steps, operations and/or elements but do not preclude the presence or addition of one or more other components, steps, operations and/or elements.

Hereinafter, in order to aid those skilled in the art to understand the present invention, the background in which the present invention is proposed will be first described and the embodiments of the present invention will be described.

A mirror reflects any light, and by using the principle of infinite reflection, it is possible to obtain an effect in which light enters the mirror like a black hole.

When mirrors are installed at both sides to be parallel, a phenomenon occurs in which light is infinitely (repeatedly) reflected by the mirrors. In this case, when a translucent mirror (half mirror) is installed on one mirror, a phenomenon in which infinite reflection occurs inside the mirror may be directly and visually observed.

According to the related art, a stereoscopic effect is realized using a three-dimensional (3D) stereoscopic display device that uses LEDs as light sources, and thus visibility and interest are induced.

However, according to the related art, there is a limitation in that user interfaces (UIs) for various scenarios are not provided in a changing environment (e.g., a vehicle driving environment).

Figure 1:
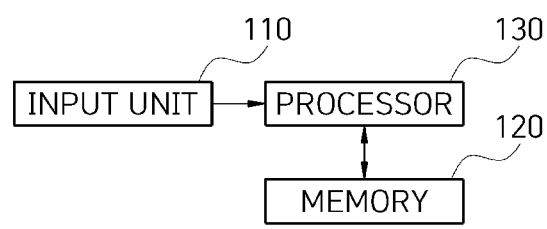
FIG. 1 illustrates an apparatus for providing cluster information using a three-dimensional (3D) image according to an embodiment of the present invention.

FIG. 1 illustrates an apparatus for providing cluster information using a 3D image according to an embodiment of the present invention.

The apparatus for providing cluster information using the 3D image according to the embodiment of the present invention includes an input unit 110 that receives display mode setting information and driving information, a memory 120 in which a cluster information providing program that uses a 3D image is stored, and a processor 130 that executes the cluster information providing program. The processor 130 controls a light source disposed in a cluster according to the display mode setting information to display the driving information including an infinite reflection image.

The cluster includes a display, a translucent mirror film stacked on the display, a light-emitting diode (LED) light source disposed on the translucent mirror film, and a translucent mirror stacked on the LED light source.

The translucent mirror film may have a preset area which is open.

The cluster is divided into a display-only area and a display and LED stereoscopic pattern simultaneous use area.

The processor 130 transmits a command signal for providing information displayed in the simultaneous use area according to the display mode setting information.

When a display extension mode is set as a display mode, the processor 130 controls the LED light source for the simultaneous use area to be turned off.

When a driving mode is set as the display mode, the processor 130 controls the LED light source for the simultaneous use area to be turned on and controls display information and the infinite reflection image for the LED light source to be displayed.

In the driving mode, the processor 130 controls power state information to be displayed by turning the LED light source on and controls regenerative braking state information to be displayed using the display information.

In the driving mode, the processor 130 controls blinking of the LED light source using traveling behavior information of a nearby vehicle and controls approach information of the nearby vehicle to be displayed.

The processor 130 controls the approach information of the nearby vehicle to be displayed by differently controlling at least one of a blinking time interval and a blinking color of the LED light source.

Figure 2:
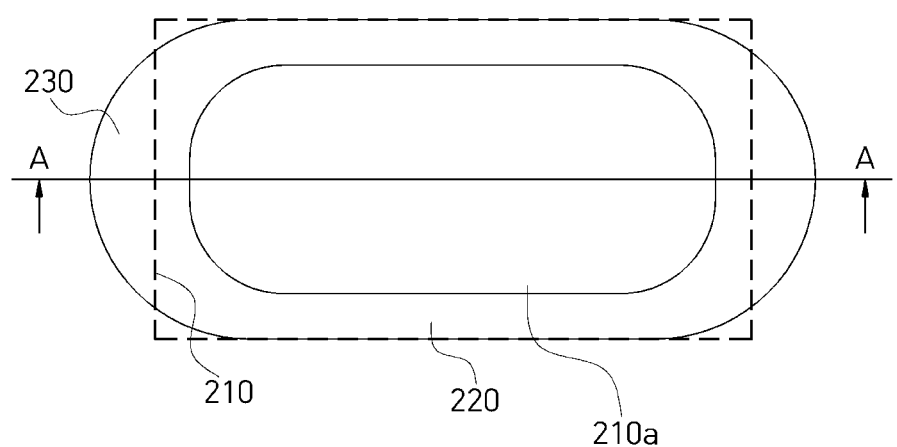
FIG. 2 is a front view of an information providing cluster using a 3D image according to an embodiment of the present invention.

FIG. 2 is a front view of an information providing cluster using a 3D image according to an embodiment of the present invention.

The information providing cluster according to the embodiment of the present invention uses an infinity mirror concept to display a 3D stereoscopic image.

According to the embodiment of the present invention, by attaching a translucent mirror film to an opaque black liquid-crystal display (LCD) (or organic light-emitting diode (OLED) display) 210, a total reflection mirror structure is realized. In this case, an area in which the translucent mirror film is not attached is realized.

The cluster is divided into a display-only area 210a and a display and LED stereoscopic pattern (infinite reflection) simultaneous use area (area in which the translucent mirror is attached) 220. The cluster according to the embodiment of the present invention includes a translucent mirror area 230 corresponding to an edge of an LED lighting unit. According to the embodiment of the present invention, it is possible to obtain an infinite reflection image effect by using a display lighting unit (image) in addition to the LED lighting unit.

Figure 3:
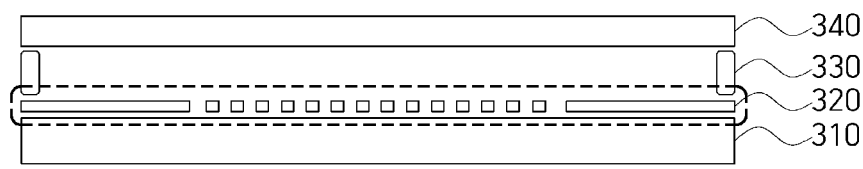
FIG. 3 is a side cross-sectional view of the information providing cluster using the 3D image according to the embodiment of the present invention.

FIG. 3 is a side cross-sectional view of the information providing cluster using the 3D image according to the embodiment of the present invention and is a side cross-sectional view taken along virtual line A-A' illustrated in FIG. 2.

Referring to FIG. 3, a translucent mirror film 320 is attached onto a display 310 to realize a laminated structure of a total reflection mirror-type translucent mirror film and a display.

In this case, it is possible to attach a front translucent mirror film to a laminated area of the translucent mirror film 320 and the display 310 and it is possible to provide a clean screen by forming a partially open area.

An LED 330 is disposed on the translucent mirror film 320, and a translucent mirror 340 is disposed on the LED 330.

Figure 4A:
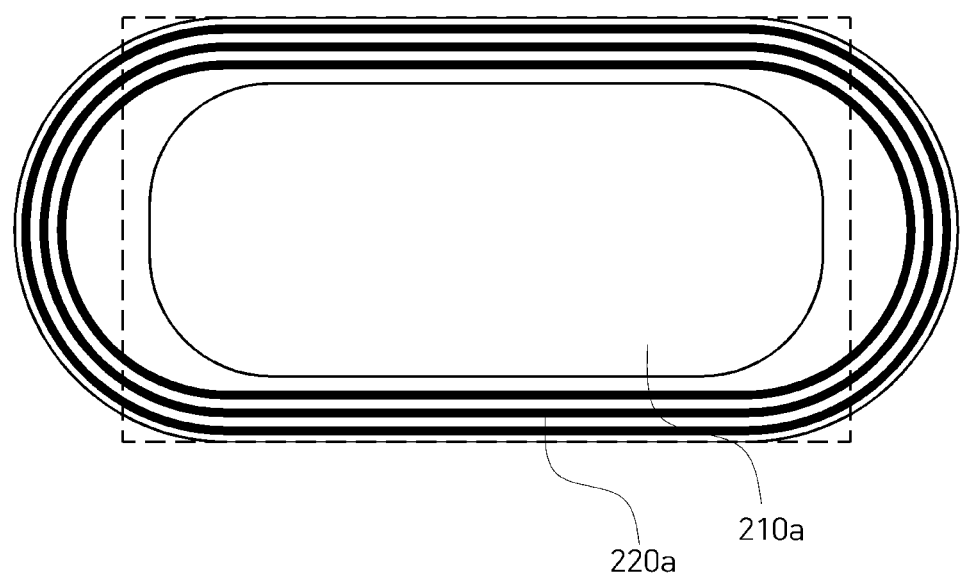
FIG. 4A through FIG. 4C illustrate application examples of the information providing cluster using the 3D image according to the embodiment of the present invention.
Figure 4B:
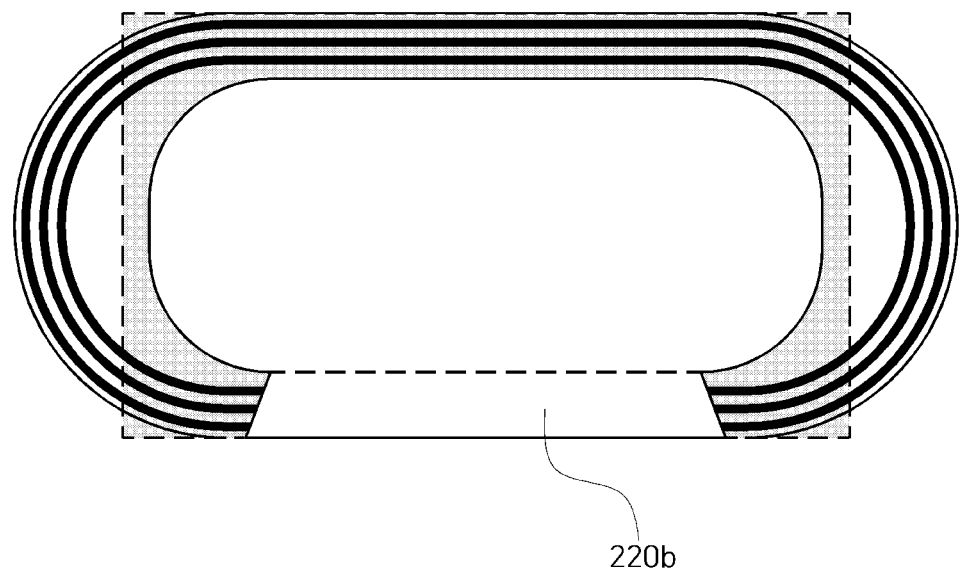
Figure 4C:
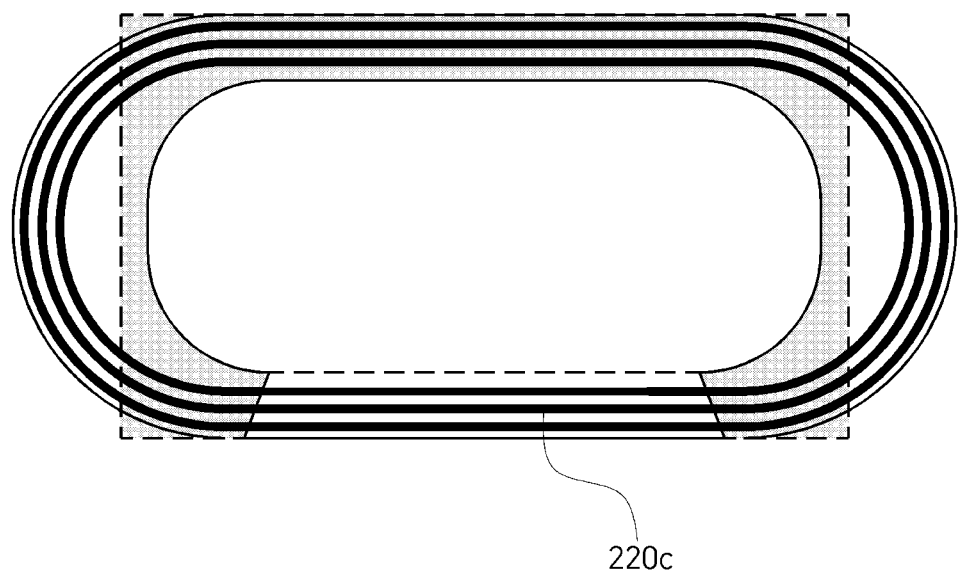

FIG. 4A through FIG. 4C illustrate application examples of the information providing cluster using the 3D image according to the embodiment of the present invention.

Referring to FIG. 4A, in a display-only area 210a, cluster information is displayed using an inner area in which a translucent mirror film is not attached. In this case, in a simultaneous use area 220a, an infinite reflection image for an LED stereoscopic pattern is realized.

Referring to FIG. 4B, in a simultaneous use area 220b, an LED operation of an infinite reflection section is interlocked, and when the LED operation is turned off, a display image is displayed.

Referring to FIG. 4C, in a simultaneous use area 220c, display information and LED infinite reflection are simultaneously displayed, thereby expressing a sense of depth of the display information.

The processor 130 determines whether the display area extends to the simultaneous use area in consideration of user setting information or driving environment information and transmits a display command signal. For example, when a default mode is a display extension mode by user setting, the LED disposed in the simultaneous use area 220b is turned off, as illustrated in FIG. 4B, and the cluster information extends to not only the above-described display area 210a but also the simultaneous use area 220b and is displayed. When a driving mode is activated by user setting, the display information and the LED infinite reflection are simultaneously displayed in the simultaneous use area 200c as illustrated in FIG. 4C, and driving-related information is displayed with a stereoscopic sense. For example, driving road information (lane information, nearby vehicle information) based on the own vehicle is displayed using a 3D image, and a description thereof will be given with reference to FIGS. 5 and 6.

Figure 5A:
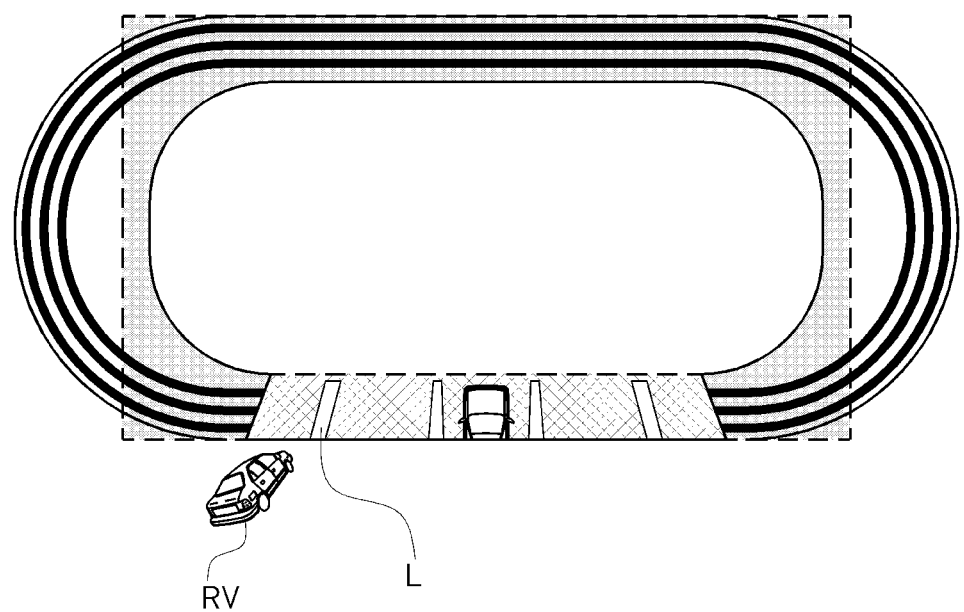
FIG. 5A through FIG. 5C illustrate exemplary diagrams of a rear-side vehicle information display of the information providing cluster using the 3D image according to the embodiment of the present invention.
Figure 5B:
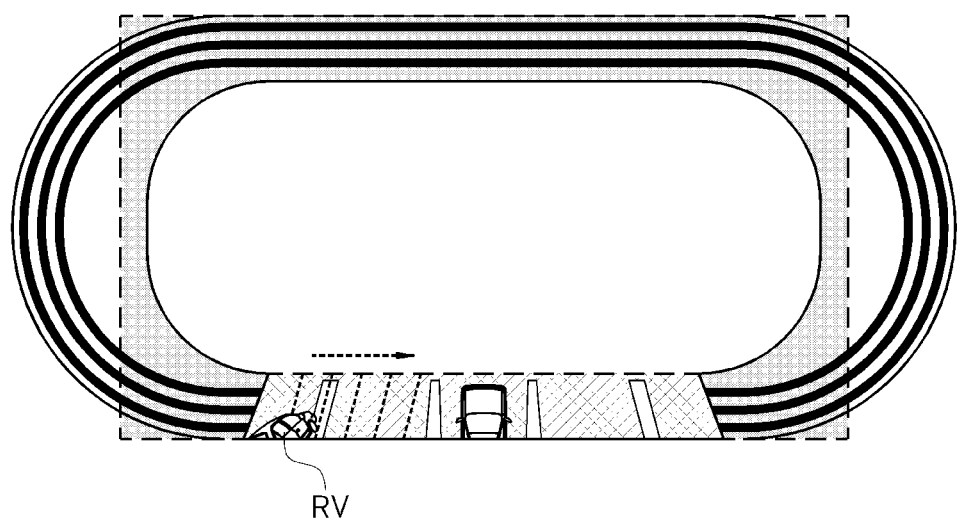
Figure 5C:
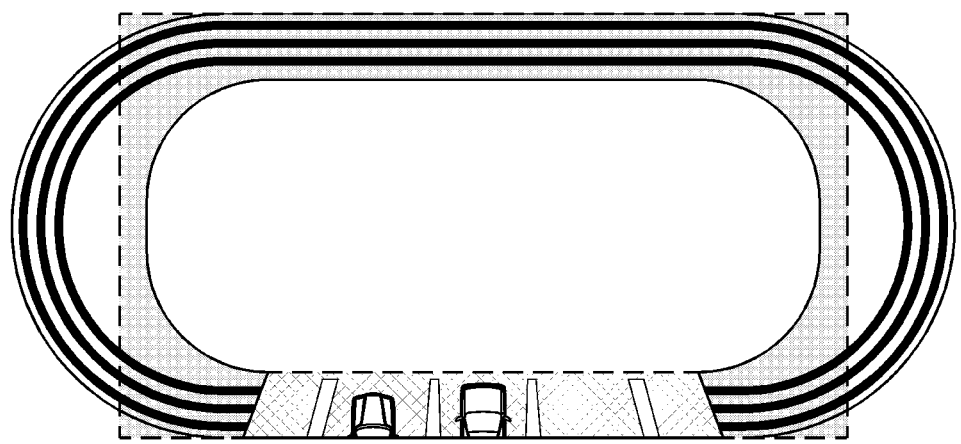

FIG. 5A through FIG. 5C illustrates exemplary diagrams of a rear-side vehicle information display of the information providing cluster using the 3D image according to the embodiment of the present invention.

Due to the characteristics of an infinity mirror, it is possible to express a sense of depth of a light source, and thus the processor 130 transmits a command signal to express a change in the number of lanes according to a lane change.

As illustrated in FIG. 5A, an LED light source is controlled so that road and lane information L is displayed using the LED light source as an infinity effect. In this case, it is assumed that there is a vehicle RV approaching a rear side of the own vehicle.

As illustrated in FIG. 5B, a vehicle RV approaching a rear side of the own vehicle is displayed in a simultaneous use area, and an approach direction of the vehicle RV approaching the rear side is displayed by repeating LED blinking (left→right blinking) of some portions of the simultaneous use area.

In this case, it is possible to display information about an approach speed of the vehicle RV approaching the rear side of the own vehicle by differently controlling a blinking time interval of the LED with respect to the traveling behavior of the vehicle RV approaching the rear side.

Further, it is possible to differently adjust a color of the LED according to the traveling behavior of the vehicle RV approaching the rear side by differently controlling a level of a warning of the driver according to a degree of collision risk.

As illustrated in FIG. 5C, when a vehicle RV approaching a rear side of the own vehicle is driving in a left side lane of the own vehicle, traveling behavior information, such as location information of the corresponding vehicle, is displayed in the simultaneous use area.

Figure 6A:
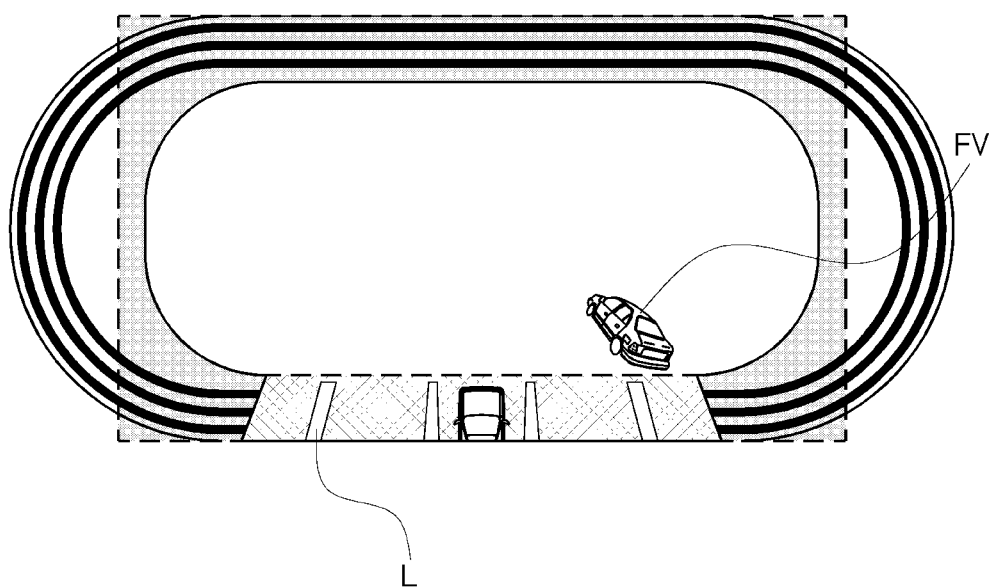
FIG. 6A through FIG. 6C illustrate exemplary diagrams of a front-side vehicle information display of the information providing cluster using the 3D image according to the embodiment of the present invention.
Figure 6B:
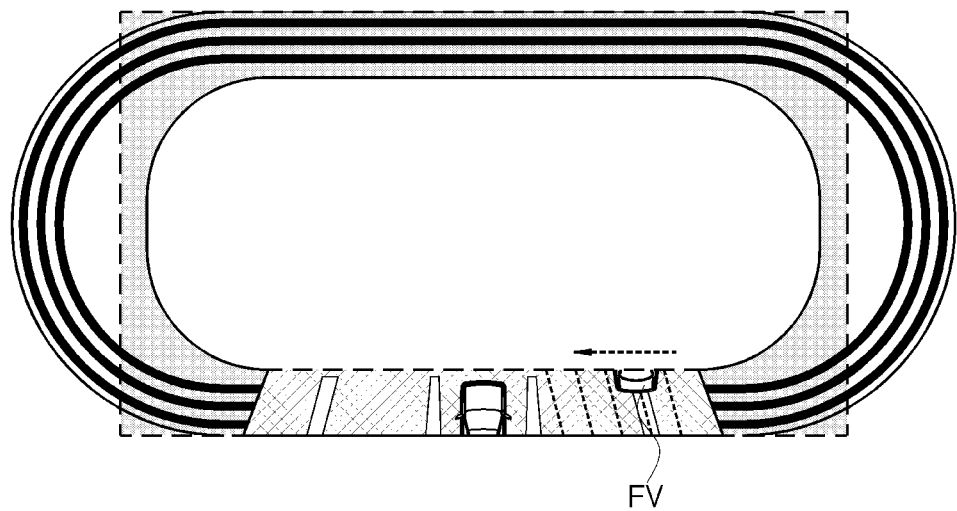
Figure 6C:
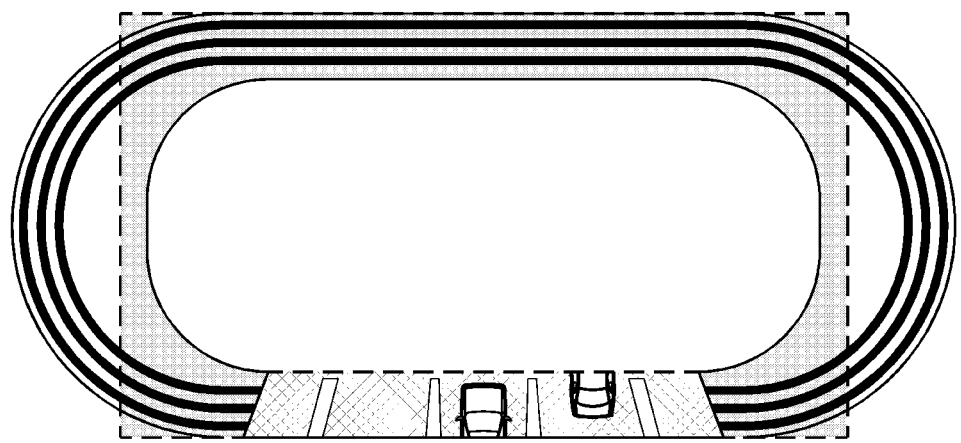

FIG. 6A through FIG. 6C illustrate exemplary diagrams of a front-side vehicle information display of the information providing cluster using the 3D image according to the embodiment of the present invention.

As illustrated in FIG. 6A, a LED light source is controlled so that load and lane information is displayed using the LED light source as an infinity effect. It is assumed that there is a vehicle FV approaching a front side of the own vehicle.

As illustrated in FIG. 6B, a vehicle FV approaching a front side of the own vehicle is displayed in a simultaneous use area, and an approach direction of the vehicle FV changing lanes in the front side is displayed by repeating LED blinking (right→left blinking) of some portions of the simultaneous use area.

In this case, as described above, information about an approach speed of the vehicle approaching the front side of the own vehicle may be displayed by differently controlling a blinking time interval of the LED with respect to the traveling behavior of the vehicle FV approaching the front side.

Further, it is possible to differently adjust a color of the LED according to the traveling behavior of the vehicle FV approaching the front side by differently controlling a level of a warning of the driver according to a degree of collision risk.

As illustrated in FIG. 6C, when a vehicle FV approaching a front side of the own vehicle completes a lane change and drives in a right side lane of the own vehicle, traveling behavior information such as location information of the corresponding vehicle is displayed in the simultaneous use area.

Figure 7A:
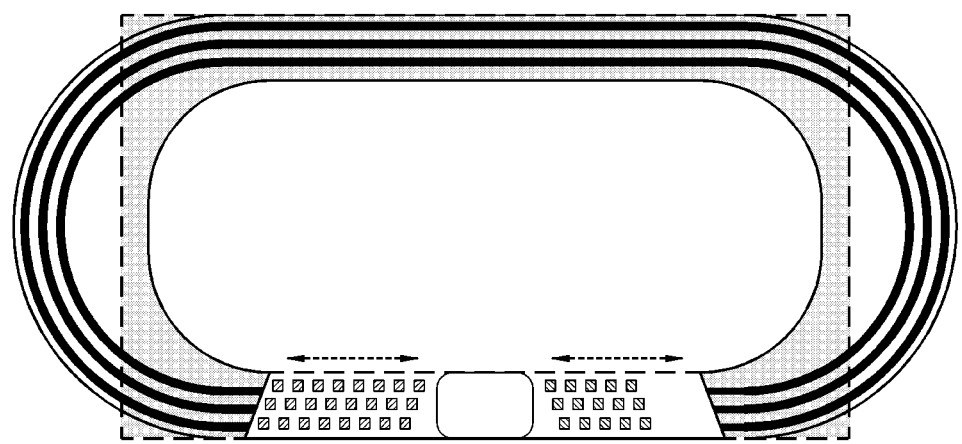
Figure 7B:
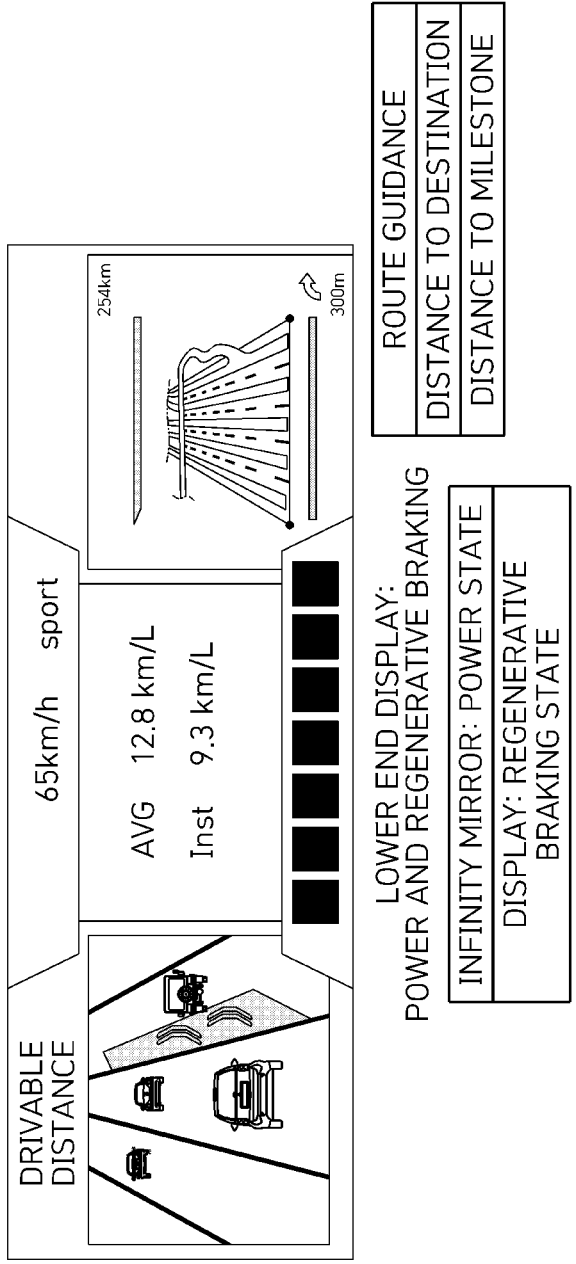

FIG. 7A through FIG. 7C illustrate exemplary diagrams of a gauge display of the information providing cluster using the 3D image according to the embodiment of the present invention.

According to the embodiment of the present invention, as illustrated in FIG. 7A, the processor 130 transmits a command signal for blinking an LED and realizes LED blinking and luminance change effect to display gauge information.

An infinity mirror LED is used for providing display information during high-speed driving and for minimizing an amount of current consumption in a regenerative braking state (in a case of driving at high speed or low speed, braking, and left/right rotation). Further, in order to minimize an amount of current consumption in an autonomous driving state, a display on state is minimized (i.e., only essential information related to safety is displayed) and an infinite reflection image is displayed using an infinity mirror.

As illustrated in FIG. 7B, a current driving speed, a current driving mode, a drivable distance, an average fuel efficiency, a current fuel efficiency, a route guidance, a distance to a destination, and a distance to a milestone are displayed. Further, power state information and regenerative braking state information are displayed at a lower end of a display-only area and, in the simultaneous use area, the power state information is controlled to be displayed through the infinity mirror and the regenerative braking state information is controlled to be displayed through the display.

As illustrated in FIG. 7C, a current driving stage, a current driving speed, a current driving mode, a drivable distance, a fuel capacity, etc. are controlled to be displayed through the display area, and information related to a blind spot warning is controlled to be displayed through the infinity mirror.

Figure 8:
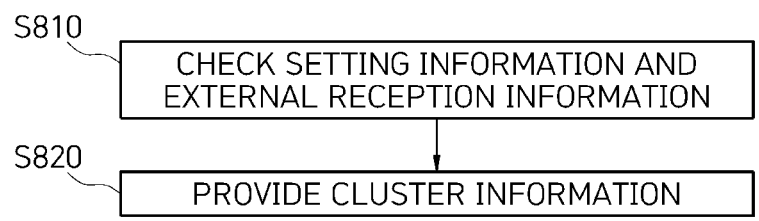
FIG. 8 illustrates a method of providing cluster information using a 3D image according to an embodiment of the present invention.

FIG. 8 illustrates a method of providing cluster information using a 3D image according to an embodiment of the present invention.

The method of providing cluster information using the 3D image according to the present invention includes operations of checking setting information and external reception information (S810) and providing cluster information (S820).

In operation S810, a setting mode for a simultaneous use area is checked. When a display extension mode is selected as a default mode by user setting, it is determined that a LED light source for the simultaneous use area is turned off. When a driving speed is greater than or equal to a certain speed or when a driving mode is activated by the user setting, it is determined that driving-related information is displayed with a stereoscopic sense by simultaneously displaying display information and LED infinite reflection in the simultaneous use area 200*c* as illustrated in FIG. 4C.

In operation S810, traveling behavior information of a nearby vehicle is obtained by checking the external reception information, and a command signal for blinking an LED with respect to the obtained information is generated.

In operation S820, as described above, a command signal is transmitted so that the setting information related to the display mode and the traveling behavior information of the nearby vehicle are combined and provided through a cluster.

In operation S820, it is possible to display information about an approach speed by differently controlling a blinking time interval of the LED indicating an approach direction according to traveling behavior of the nearby vehicle.

In operation S820, it is possible to differently adjust a level of a driver's warning according to a degree of collision risk with the nearby vehicle by differently controlling a color of the LED indicating the approach direction according to the traveling behavior of the nearby vehicle.

For example, as a result of determining a degree of collision risk with a nearby vehicle, when the degree of risk is a preset level or higher, a blinking direction of a red LED light source instead of in a blinking direction of a blue LED light source is indicated as the approach direction so that the driver may intuitively recognize that there is a risk of collision.

Further, when advanced driver-assistance systems (ADAS) intervene because there is a risk of collision due to the approach of the nearby vehicle, information related to traveling behavior of the own vehicle (e.g., urgent lane change) is displayed, and thus the driver is supported to recognize the intervention of the ADAS.

Meanwhile, the method of providing cluster information using the 3D image according to the present invention may be implemented in a computer system or recorded on a recording medium. The computer system may include at least one processor, a memory, a user input device, a data communication bus, a user output device, and a storage. The above-described components perform data communication through the data communication bus.

The computer system may further include a network interface coupled to a network. The processor may include a central processing unit (CPU) or a semiconductor device that processes instructions stored in the memory and/or the storage.

The memory and the storage may include various types of volatile or nonvolatile storage media. For example, the memory may include a read-only memory (ROM) and a random access memory (RAM).

Therefore, the method of providing cluster information using the 3D image according to the present invention may be implemented as a computer-executable method. When the method of providing cluster information using the 3D image according to the present invention is performed in a computer device, computer-readable instructions may perform the method of providing cluster information using the 3D image according to the present invention.

Meanwhile, the method of providing cluster information using the 3D image according to the present invention described above may be implemented as computer-readable code on a computer-readable recording medium. The computer-readable recording medium includes any type of recording medium in which data that may be read by a computer system is stored. For example, the computer-readable recording medium may include a ROM, a RAM, a magnetic tape, a magnetic disk, a flash memory, an optical data storage device, and the like. Further, the computer-readable recording medium may be distributed in computer systems connected through a computer communication network and may be stored and executed as code that may be read in a distributed manner.

According to the present invention, by providing a 3D image with an infinite reflection effect through a cluster, it is possible to support the user to more intuitively recognize driving-related information.

Effects of the present invention are not limited to the above-described effects and other effects which have not been described may be clearly understood by those skilled in the art from the above descriptions.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. An apparatus for providing cluster information using a three-dimensional (3D) image, the apparatus comprising:
    an input unit configured to receive display mode setting information and driving information;
    a memory configured to store a cluster information providing program that uses a 3D image; and
    a processor configured to execute the cluster information providing program to continue the apparatus to:
        control a light source disposed in a cluster according to the display mode setting information to display the driving information including an infinite reflection image, the cluster being divided into a display-only area and a display and LED stereoscopic pattern simultaneous use area, and
        transmit a command signal for providing information displayed in the simultaneous use area according to the display mode setting information.

2. The apparatus of claim 1, wherein the cluster includes a display, a translucent mirror film stacked on the display, a light-emitting diode (LED) light source disposed on the translucent mirror film, and a translucent mirror stacked on the LED light source.

3. The apparatus of claim 2, wherein the translucent mirror film is provided in a form in which a preset area is open.

4. The apparatus of claim 1, wherein, when a display extension mode is set as a display mode, the processor controls the LED light source for the simultaneous use area to be turned off.

5. The apparatus of claim 1, wherein, when a driving mode is set as a display mode, the processor controls the LED light source for the simultaneous use area to be turned on and controls display information and the infinite reflection image with the LED light source to be displayed.

6. The apparatus of claim 5, wherein, in the driving mode, the processor controls power state information to be displayed by turning the LED light source on and controls regenerative braking state information to be displayed using the display information.

7. The apparatus of claim 5, wherein, in the driving mode, the processor controls blinking of the LED light source using traveling behavior information of a nearby vehicle and controls approach information of the nearby vehicle to be displayed.

8. The apparatus of claim 7, wherein the processor controls the approach information of the nearby vehicle to be displayed by changing at least one of a blinking time interval and a blinking color of the LED light source.

9. A processor-implemented method of providing cluster information using a three-dimensional (3D) image, the method comprising:

checking setting information and external reception information;

providing cluster information including an infinite reflection image according to the setting information and the external reception information; and controlling display information and infinite reflection that uses a light-emitting diode (LED) light source to be simultaneously displayed in a simultaneous use area, in response to the setting information being a driving mode for the simultaneous use area.

10. The method of claim 9, wherein the providing of the cluster information comprises determining a light-emitting diode (LED) light source for the simultaneous use area to be turned off, in response to confirming that the setting information is a default mode for the simultaneous use area.

11. The method of claim 9, wherein the providing of the cluster information comprises controlling the LED light source for the simultaneous use area to be turned on or off and controlling the traveling behavior information to be displayed, in response to a traveling behavior information of a nearby vehicle being obtained as the external reception information.

12. The method of claim 11, wherein the providing of the cluster information comprises determining a degree of collision risk according to the traveling behavior information and controlling at least one of a lighting timing and a color of the LED light source to be changed and displayed.

* * * * *